US010916181B2

(12) United States Patent
Lin et al.

(10) Patent No.: US 10,916,181 B2
(45) Date of Patent: Feb. 9, 2021

(54) DISPLAY DEVICE

(71) Applicant: AU Optronics Corporation, Hsin-Chu (TW)

(72) Inventors: Rong-Fu Lin, Hsin-Chu (TW); Kai-Wei Hong, Hsin-Chu (TW); Jie-Chuan Huang, Hsin-Chu (TW); Peng-Bo Xi, Hsin-Chu (TW); Sung-Yu Su, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/700,855

(22) Filed: Dec. 2, 2019

(65) Prior Publication Data

US 2020/0105181 A1 Apr. 2, 2020

Related U.S. Application Data

(63) Continuation of application No. 15/789,255, filed on Oct. 20, 2017, now Pat. No. 10,529,270.

(30) Foreign Application Priority Data

Mar. 13, 2017 (TW) .............................. 106108103 A

(51) Int. Cl.
*G06F 3/038* (2013.01)
*G09G 5/00* (2006.01)
(Continued)

(52) U.S. Cl.
CPC ......... *G09G 3/2092* (2013.01); *G06F 3/0412* (2013.01); *G06F 2203/04107* (2013.01); *G09G 2310/0286* (2013.01); *G09G 2310/0289* (2013.01); *G09G 2310/0297* (2013.01); *G09G 2310/08* (2013.01); *G09G 2330/06* (2013.01); *G09G 2354/00* (2013.01)

(58) Field of Classification Search
CPC . G02F 1/1368; G02F 1/136286; G06F 3/0412
See application file for complete search history.

(56) References Cited

U.S. PATENT DOCUMENTS

2005/0088589 A1\* 4/2005 Edwards ............. G02F 1/13452
349/110
2010/0220071 A1 9/2010 Nishihara et al.
(Continued)

FOREIGN PATENT DOCUMENTS

CN 101813844 A 8/2010

OTHER PUBLICATIONS

CNIPA "Office Action" dated Aug. 23, 2019.

*Primary Examiner* — Nan-Ying Yang
(74) *Attorney, Agent, or Firm* — WPAT, PC

(57) ABSTRACT

A display device comprising an active area and a surrounding area is provided. The active area includes a common electrode for receiving a common voltage. The surrounding area is located at a side of the active area, and the surrounding area includes a shielding metal layer and a surrounding circuit. The shielding metal layer is electrically isolated from the common electrode and receives a shielding voltage. The surrounding circuit and a first shielding metal are overlapped in a vertical projection direction, and the common voltage is power-isolated from the shielding voltage.

17 Claims, 6 Drawing Sheets

(51) Int. Cl.
*G09G 3/20* (2006.01)
*G06F 3/041* (2006.01)

(56) References Cited

U.S. PATENT DOCUMENTS

| | | | |
|---|---|---|---|
| 2015/0301415 A1* | 10/2015 | Sawada | G09G 3/3677 349/147 |
| 2016/0034097 A1* | 2/2016 | Chae | G06F 3/0412 345/173 |
| 2017/0192614 A1* | 7/2017 | Lee | G06F 3/0412 |
| 2017/0277320 A1* | 9/2017 | Choi | G06F 3/044 |

* cited by examiner

400

DISPLAY DEVICE

BACKGROUND

Technical Field

The present invention relates to a display device, and in particular, to a display device capable of reducing noises, optimizing display quality, or improving touch sensitivity.

Related Art

To comply with a demand of the display with narrow border, a multiplexer and a shift register (SR) are integrated into a display panel. To integrate touch detection and display actions, a controller of a display device outputs high-frequency drive signals to perform touch detection and display actions. To improve the resolution causes the operation of a touch to overlap with operation of a display. Consequently, the touch signal and display quality are interactively affected.

In the conventional techniques, a common electrode of an active area extends to the surrounding area (a multiplexer and a shift register), to isolate noises generated from the multiplexer and the shift register. However, the common electrode is easily interfered by high-frequency drive signals from the multiplexer and the shift register. Consequently, the touch signal and display quality are interactively affected.

SUMMARY

The embodiment of the present invention provides a display device, comprising an active area and a surrounding area. The active area comprises a common electrode for receiving a common voltage. The surrounding area is located at a side of the active area, and the surrounding area comprises a shielding metal layer and a surrounding circuit. The shielding metal layer is electrically isolated from the common electrode and receives a shielding voltage. The surrounding circuit and the shielding metal layer are overlapped in a vertical projection direction. The common voltage is power-isolated from the shielding voltage.

The embodiment of the present invention provides a display device, comprising a common electrode, a shielding metal layer, a surrounding circuit, a common signal pad, and a shielding signal pad. The shielding metal layer is located at a side of the common electrode, and the common electrode is electrically isolated from the shielding metal layer. The surrounding circuit and the shielding metal layer are overlapped. The common signal pad is electrically coupled to the common electrode. The shielding signal pad is electrically coupled to the shielding metal layer.

The embodiment of the present invention provides a display device, comprising an active area, a surrounding area and a reverse gate electrode. The active area comprises a common electrode and a gate electrode. The surrounding area is located at a side of the active area and comprises a surrounding circuit. The common electrode receives a common voltage. The gate electrode is located at the active area and receives a gate drive signal. The surrounding circuit receives a plurality of surrounding signals. The reverse gate electrode is separately electrically isolated from the gate electrode and the surrounding circuit and receives a reverse gate drive signal. The reverse gate drive signal is complementary with at least one of the gate drive signals and the plurality of surrounding signals, or the reverse gate drive signal is complementary with a combination of the plurality of gate drive signals and the plurality of surrounding signals.

The embodiment of the present invention provides a display device, comprising an active area, a shielding surrounding area and a reverse electrode. The surrounding area is located nearby the active area. The active area comprises a common electrode and a gate electrode. The common electrode receives a common voltage. The gate electrode is located at the active area and receives a gate drive signal. The surrounding area comprises a surrounding circuit and the surrounding circuit has a plurality of the shift registers and a plurality of the multiplex circuits. The plurality of the shift registers receives a plurality of the frequency signals and the plurality of the multiplex circuits receives a plurality of the control signals. The reverse electrode is separately electrically isolated from the gate electrode and the surrounding circuit, and the reverse electrode receives a reverse signal. The reverse signal is complementary with the plurality of the control signals, the plurality of the frequency signals, or the combination of the plurality of the control signals and the plurality of the frequency signals.

To make the features and advantages of the present application more obvious and easily understood, detailed descriptions are made below by using embodiments as examples and with reference to the attached accompanying drawings.

DETAILED DESCRIPTION

Now refer to embodiments of the present invention for details. Examples are shown in the figures. If possible, same reference signs are used in the figures and the specification to indicate same or similar components.

For clearness, sizes and relative sizes of layers shown in the figures are adjusted.

Figure 1:
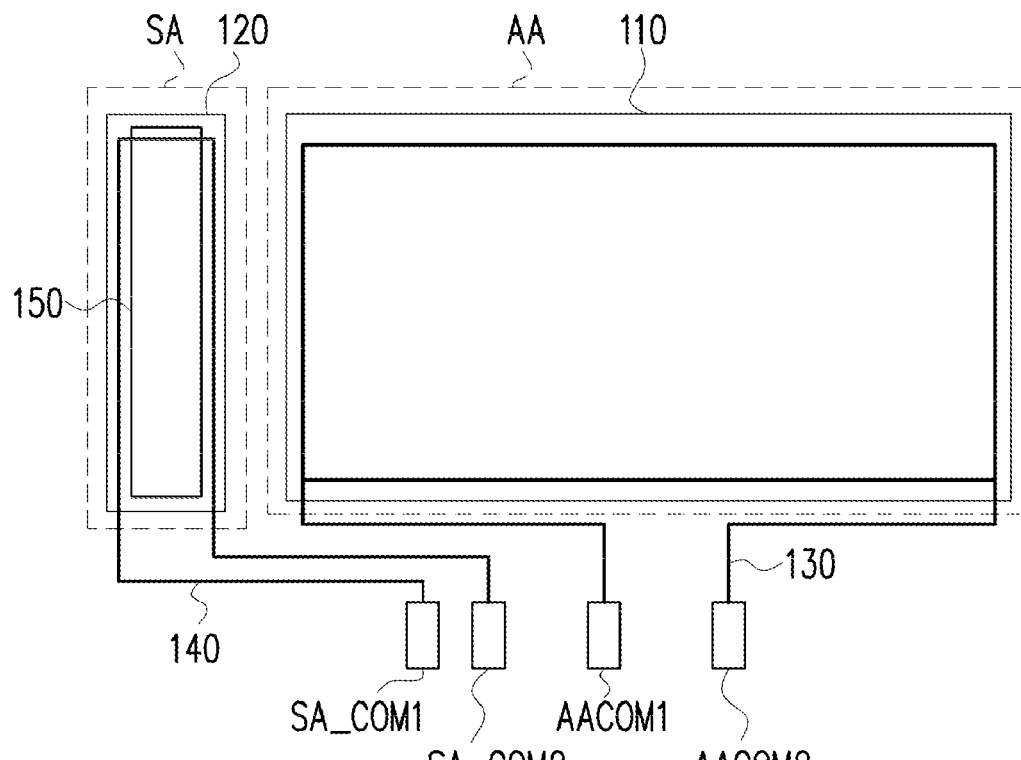
FIG. 1 is a schematic top view illustrating a display device according to an embodiment of the present invention.

Referring to FIG. 1, FIG. 1 is a schematic top view illustrating a display device according to an embodiment of the present invention. In FIG. 1, a display device 100 includes an active area AA and a surrounding area SA. The surrounding area SA is configured at a side of the active area AA, but the present invention is not limited thereto. For example, in different embodiments, the surrounding area SA is located at two sides or three sides of the active area AA. In addition, the surrounding area SA is also configured around the active area AA. The display device 100 includes common signal pads AACOM1, AACOM2 and shielding signal pads SA_COM1, SA_COM2. The common signal pads AACOM1 and AACOM2 are coupled to a common electrode 110 in the active area AA by a wire 130, and the shielding signal pads SA_COM1 and SA_COM2 are coupled to a shielding metal layer 120 in the surrounding area SA by a wire 140. The common signal pads AACOM1 and AACOM2 receive a common voltage, and the shielding signal pads SA_COM1 and SA_COM2 are used to receive a shielding voltage. In this embodiment of the present invention, voltage levels of the common voltage and the shielding voltage are substantially same or different.

In this embodiment, the common electrode 110 in the active area AA is electrically isolated from the shielding metal layer 120 in the surrounding area SA. That is, the common electrode 110 in the active area AA and the shielding metal layer 120 in the surrounding area SA are not physically connected, are mutually disconnected, and are separate in structure. In this way, change of electrical characteristics of the shielding metal layer 120 does not affect electrical characteristics of the common electrode 110. Likewise, change of the electrical characteristics of the common electrode 110 does not affect the electrical characteristics of the shielding metal layer 120. Therefore, as a result, noises of the shielding metal layer 120 and the common electrode 110 are not mutually transmitted.

In details, the surrounding area SA includes a surrounding circuit 150. In the vertical projection direction, overlapping areas are where the surrounding circuit 150 and the shielding metal layer 120 are overlapped. For ease of description, in the embodiment shown in FIG. 1, a zone area occupied by the surrounding circuit 150 is slightly smaller than that of the shielding metal layer 120 so that the part of the shielding metal layer 120 overlaps with the surrounding circuit 150. However, the present invention is not limited thereto. For example, a zone area of the surrounding circuit 150 is substantially the same as that of the shielding metal layer 120. In addition, for some factors such as metal layout, convenience of a manufacture procedure, or electric considering, the overlapping area of the surrounding circuit 150 and the shielding metal layer 120 in the vertical projection direction are appropriately adjusted.

In this embodiment, the surrounding area SA is at least one of a shift register area or a multiplexer circuit area. That is, the surrounding area SA includes a shift register circuit, a multiplexer circuit, or metal wires.

Figure 2:
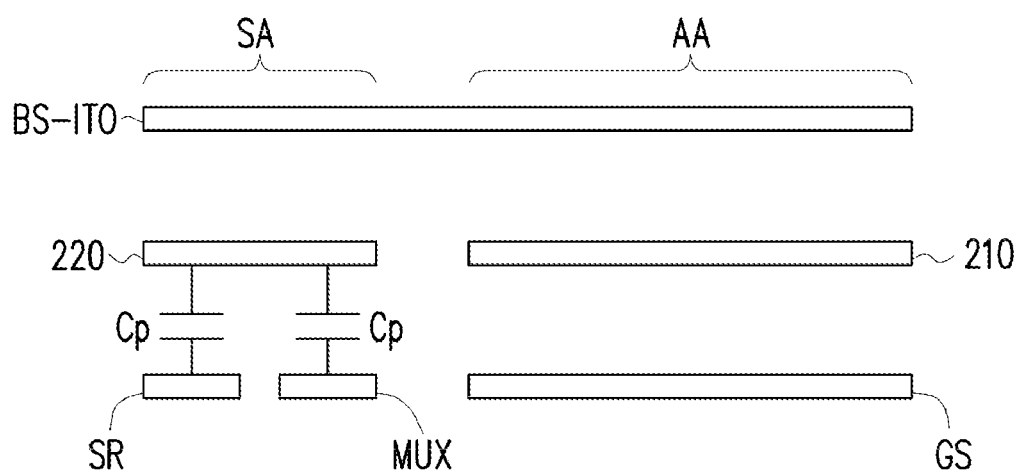
FIG. 2 is a schematic cross-section diagram illustrating a display device according to an embodiment of the present invention.

Referring to FIG. 2, FIG. 2 is a schematic cross-section diagram illustrating a display device according to an embodiment of the present invention. In FIG. 2, a display device 200 includes a first substrate (not shown), a second substrate (not shown), and a display dielectric layer (not shown). The display dielectric layer sandwiched between the first substrate and the second substrate is controlled by voltage driving to achieve a display function. The display device 200 consisting of the first substrate and the second substrate is defined the active area AA and the surrounding area SA, and the surrounding area SA is located at least at a side of the active area AA. The display device 200 further includes an electrostatic shielding layer BS-ITO, a common electrode 210, a gate electrode GS, a shielding metal layer 220, a multiplexer circuit MUX, and a shift register circuit SR. In this embodiment, the electrostatic shielding layer BS-ITO is disposed on the first substrate and extends between the active area AA and the surrounding area SA. The common electrode 210, the gate electrode GS, the shielding metal layer 220, the multiplexer circuit MUX, and the shift register circuit SR are disposed on the second substrate.

In the embodiment of FIG. 2, the common electrode 210 is configured in the active area AA of the display device 200, so that the common electrode 210 overlaps with the electrostatic shielding layer BS-ITO. That is, an area of the common electrode 210 in the vertical projection on the second substrate overlaps with an area of the electrostatic shielding layer BS-ITO in the vertical projection on the second substrate. In addition, the shielding metal layer 220 is configured in the surrounding area SA of the display device 200, so that the shielding metal layer 220 overlaps with the electrostatic shielding layer BS-ITO. That is, an area of the shielding metal layer 220 in vertical projection on the second substrate overlaps with an area of the electrostatic shielding layer BS-ITO in vertical projection on the second substrate. In this embodiment, the surrounding circuit includes a multiplexer circuit MUX and a shift register circuit SR. The multiplexer circuit MUX and the shift register circuit SR are separately configured between the shielding metal layer 220 and the second substrate (not shown), so that the multiplexer circuit MUX and the shift register circuit SR separately have an overlapping area with the shielding metal layer 220 in the vertical projection direction. Therefore, the multiplexer circuit MUX and the shift register circuit SR separately generate a parasitic capacitor Cp with the shielding metal layer 220, as shown in FIG. 2.

In this embodiment, the common electrode 210 receives the common voltage, and the shielding metal layer 220 is used to receive the shielding voltage. In an operation of the display device, the multiplexer circuit MUX and the shift register circuit SR receive required surrounding signals. For example, the surrounding signals are a frequency signal received by the multiplexer circuit MUX and a control signal received by the shift register circuit SR. Under this condition, noises generated from the multiplexer circuit MUX and the shift register circuit SR due to operations are coupled to the shielding metal layer 220 by the corresponding parasitic capacitor Cp. When the shielding metal layer 220 and the common electrode 210 do not contact each other and be formed in electrical isolation, noises of the shielding metal layer 220 and the common electrode 210 are not mutually transmitted. That is, noises generated from the multiplexer circuit MUX or the shift register circuit SR are shielded by the shielding metal layer 220, thereby reducing the noises on the common electrode 210 to provide good display quality. In addition, when the display device 200 is provided with a touch sensing structure, noise shielding is also formed, thereby reducing noises on a touch detection performed in the active area.

To ensure that noises are not transferred to the common electrode 210. The shielding metal layer 220 and the common electrode 210 are electrically isolated from each other in structure so that the shielding metal layer 220 and the common electrode 210 are separated in structure. Moreover, this embodiment of the present invention further provides that power signals separately supplied to the common voltage and the shielding voltage are power-isolated. That is, the common voltage and the shielding voltage are respectively from different power sources and block a possibility that noises generated by the surrounding circuit can be coupled to a common voltage power source through a shielding electrode 220 and a power source of the shielding electrode 220.

Figure 3:
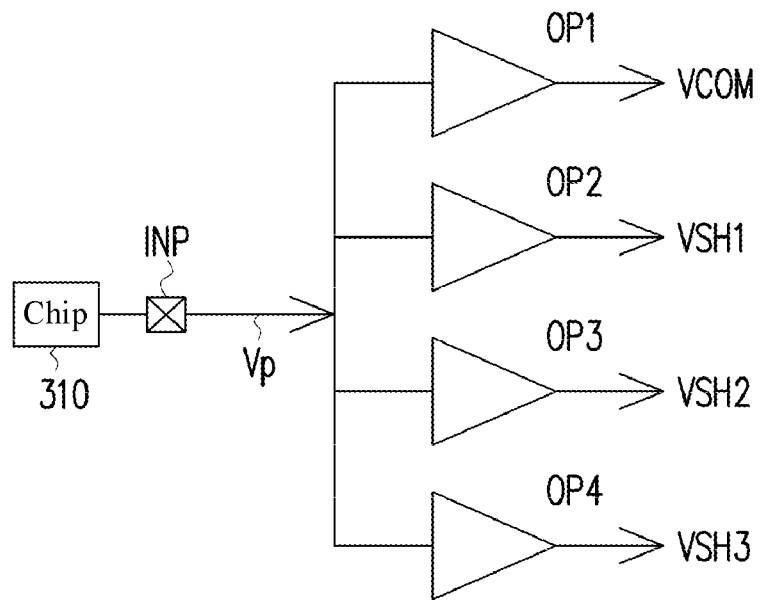
FIG. 3 is a schematic diagram illustrating a power generation of a display device according to an embodiment of the present invention.

In details of the power isolation, refer to FIG. 3. FIG. 3 is a schematic diagram illustrating a power generation of a display device according to an embodiment of the present invention. In the embodiment of FIG. 3, a power source of a common voltage VCOM is isolated from a power source of a shielding voltage VSH1. That is, the common voltage VCOM and the shielding voltage VSH1 are from different power sources, and voltage levels of the common voltage VCOM and the shielding voltage VSH1 are substantially same or different. In an embodiment, the voltage levels of the common voltage VCOM and the shielding voltage VSH1 are substantially same, so as to avoid the shielding electrode effecting on the behavior of the display dielectric layer. It results relatively good display quality. In another embodiment, the voltage levels of the common voltage VCOM and the shielding voltage VSH1 are different. For example, the shielding voltage VSH1 is a grounding voltage. It results a stable voltage source to enhance stability of noise shielding. In the embodiment of FIG. 3, the display device further includes a plurality of operational amplification units OP1 and OP2 to form multiple separately independent power sources. In details, the operational amplification units OP1 and OP2 both receive a power signal VP, and the operational amplification units OP1 and OP2 each generate a common voltage VCOM and a shielding voltage VSH1 according to the power signal VP. The common voltage VCOM is provided to the common electrode of the active area of the display device, and the shielding voltage VSH1 is separately provided to the shielding metal layer of the surrounding area of the display device. By the component characteristics of the operational amplification units OP1 and OP2, the common voltage VCOM and the shielding voltage VSH1 do not form a situation in which voltage signal is recharged to the power signal VP and a chip 310 providing the power signal VP. In this embodiment, the common voltage VCOM and the shielding voltage VSH1 that are power-isolated and whose voltage levels are substantially same, thereby achieving that noises or interferences of two voltage sources do not interactively affect.

In this embodiment, the operational amplification units OP1 and OP2 are disposed on the circuit board, and the circuit board further includes a voltage input pad INP. Input nodes of the operational amplification units OP1 and OP2 are separately coupled to the voltage input pad INP. The display device still includes the chip 310, and the chip 310 provides a voltage to electrode layers. The chip 310 disposed on the circuit board is coupled to the voltage input pad INP, and provides the power signal VP. For example, the chip 310 is disposed on the voltage input pad INP by a conductive adhesive or another conductive material, or is coupled to the voltage input pad INP by a metal element of the circuit board. Referring to both FIG. 1 and FIG. 3, the common voltage VCOM and the shielding voltage VSH1 of the circuit board are separately electrically transmitted to common signal pads AACOM1, AACOM2 and shielding signal pads SA_COM1, SA_COM2. In this way, a common electrode 110 and the shielding metal layer 120 are electrically isolated in structure and also are power-isolated in voltage source. Therefore, noises generated from the surrounding circuit are shielded by the shielding metal layer in electrode structures or signal transfer. It results that interference with the common electrode is reduced to improving display quality or touch sensing sensitivity.

Figure 6:
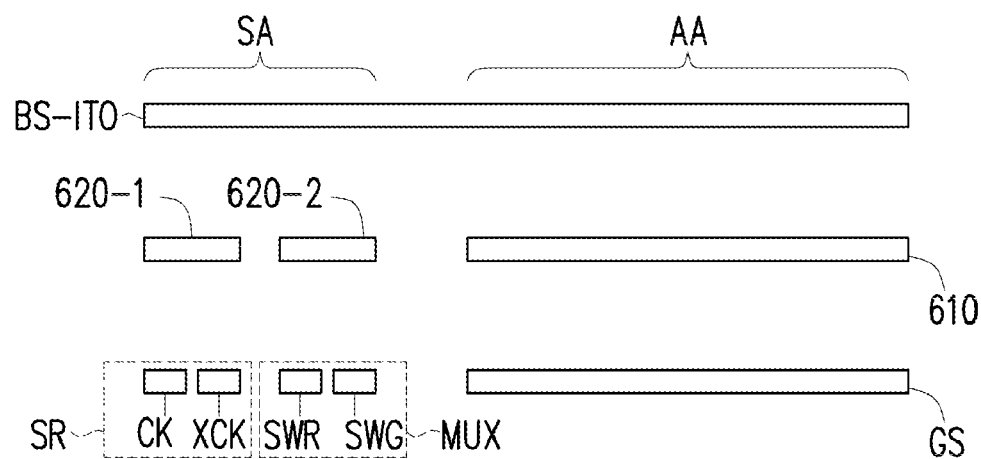
FIG. 6 is a schematic cross-section diagram illustrating a display device according to another embodiment of the present invention.
Figure 7:
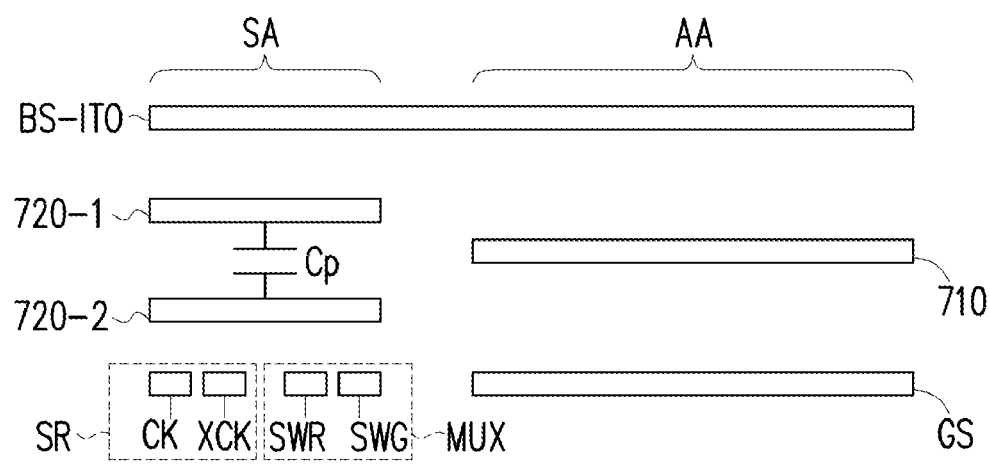
FIG. 7 is a schematic cross-section diagram illustrating display device according to another embodiment of the present invention.
Figure 8:
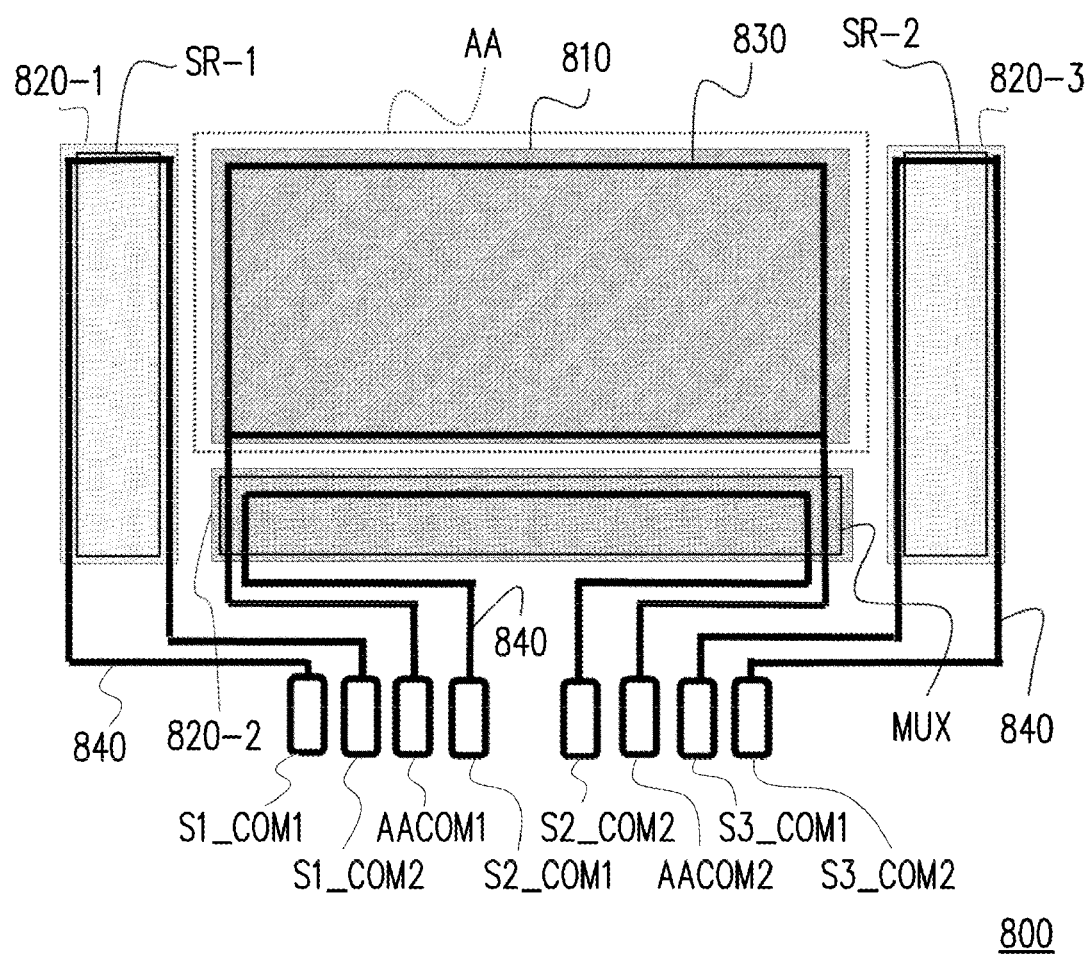
FIG. 8 is a schematic top view illustrating a display device according to an embodiment of the present invention.

In another embodiment, the display device includes multiple electrically isolated shielding metal layers, as shown in FIG. 6, FIG. 7, or FIG. 8, and operational amplifiers OP3 and OP4 are further additionally disposed on the circuit board. The operational amplifiers OP3 and OP4 are both coupled to the voltage input pad INP and separately generate shielding voltages VSH2 and VSH3 according to the power signal VP. The shielding voltages VSH1 to VSH3 are separately provided to the multiple electrically isolated shielding metal layers. Therefore, multiple operational amplifiers are disposed according to different designs and quantities of the shielding metal layers to form corresponding power-isolated shielding voltages. In another embodiment, the chip and the operational amplifiers are also disposed on the first substrate or the second substrate.

Figure 4:
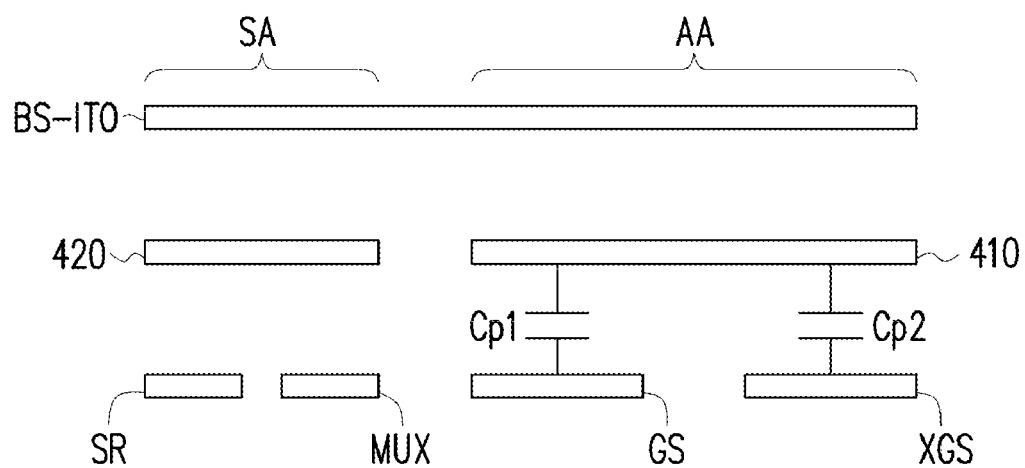
FIG. 4 is a schematic cross-section diagram illustrating a display device according to another embodiment of the present invention.

Referring to FIG. 4, FIG. 4 is a schematic cross-section diagram illustrating a display device according to another embodiment of the present invention. In this embodiment, a display device 400 comprises a gate electrode GS and a reverse gate electrode XGS. The gate electrode GS receives a gate drive signal, and the reverse gate electrode XGS receives a reverse gate drive signal. In this embodiment of the FIG. 4, the reverse gate electrode XGS and the gate electrode GS are both configured on a same substrate (such as the second substrate, not shown) and are located between the common electrode 410 and the substrate, so that overlapping areas are where the reverse gate electrode XGS and the common electrode 410 are overlapped in a vertical projection direction. The reverse gate electrode XGS is electrically isolated from the gate electrode GS, that is, the reverse gate electrode XGS and the gate electrode GS are not physically connected and are mutually disconnected. The shielding metal layer 420 is similar to the shielding metal layer 220 as shown and described in FIG. 2. That is, the shielding metal layer 420 and the common electrode 410 are electrically isolated from each other in structure so that the shielding metal layer 420 and the common electrode 410 are separated in structure.

In this embodiment, the gate electrode GS receives the gate drive signal, and the reverse gate electrode XGS is used to receive the reverse gate drive signal. The reverse gate drive signal is complementary with the gate drive signal. The reverse gate drive signal received by the reverse gate electrode XGS is complementary with the gate drive signal, and it further reduces noises interference with common electrode 410. Regarding a complementary relationship between the gate drive signal and the reverse gate drive signal is that the gate drive signal and the reverse gate drive signal are both periodic signals. When a signal level of the gate drive signal is high, a signal level of the reverse gate drive signal is low. When the signal level of the gate drive signal is low, the signal level of the reverse gate drive signal is high. In this embodiment, a parasitic capacitor Cp1 is formed between the common electrode 410 and the gate electrode GS, and a parasitic capacitor Cp2 is also formed between the common electrode 410 and the reverse gate electrode XGS. When the gate drive signal and the reverse gate drive signal have complementary levels, the parasitic capacitor Cp1 and the parasitic capacitor Cp2 are offset, so as to reduce interference generated by the gate drive signal with the common electrode 410. Likewise, when the display device has a touch sensing structure, touch sensitivity is further optimized. In the practice of the embodiment, the reverse gate drive signal is generated by an inverter received the gate drive signal.

Figure 5A:
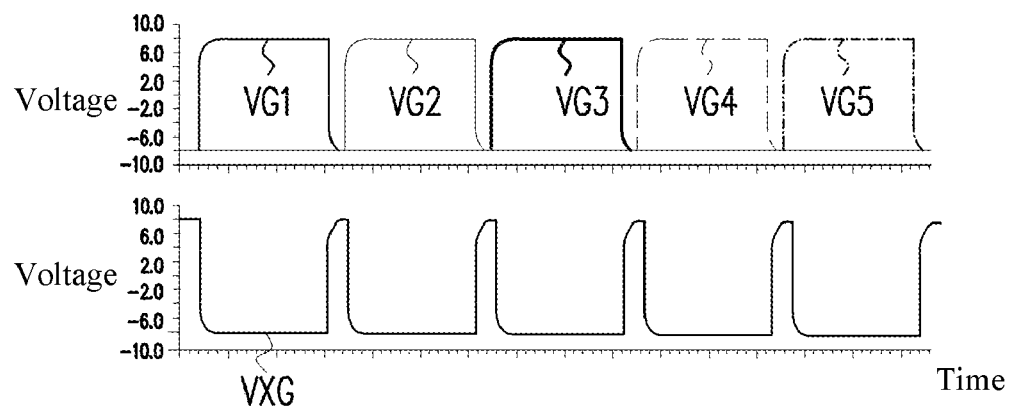
FIG. 5A is a schematic waveform diagram illustrating a reverse gate drive signal according to an embodiment of the present invention.
Figure 5B:
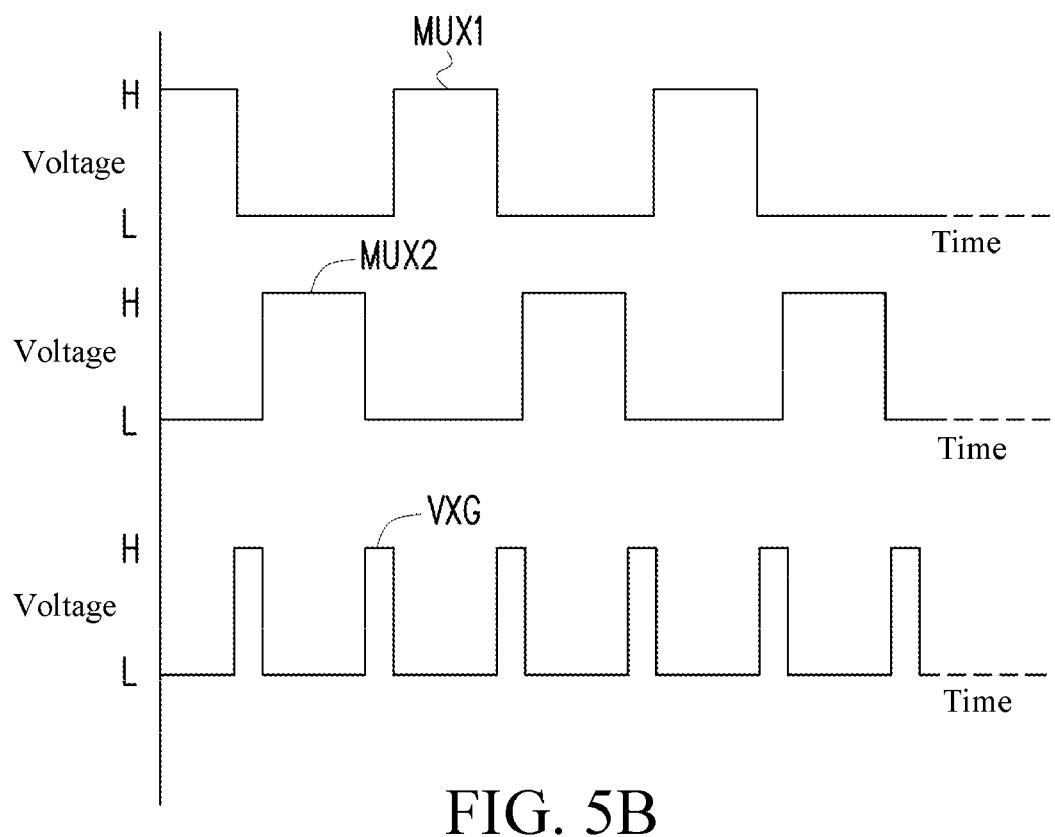
FIG. 5B is a schematic waveform diagram illustrating a reverse gate drive signal according to another embodiment of the present invention.

Referring to FIG. 5A, FIG. 5A is a schematic waveform diagram illustrating a reverse gate drive signal according to an embodiment of the present invention. In this embodiment, the display device includes multiple gate drive signals VG1, VG2, VG3, VG4, and VG5 that function in sequence. For ease of description, only the gate drive signal VG1 to the gate drive signal VG5 are shown. However, the present invention is not limited thereto. A method for generating the reverse gate drive signal VXG is raising the reverse gate drive signal VXG when one of the gate drive signals VG1, VG2, VG3, VG4, and VG5 is from high voltage level to low voltage level. In addition, falling the reverse gate drive signal VXG when one of the gate drive signals VG1, VG2, VG3, VG4, and VG5 is from low voltage level to high voltage level. In FIG. 5A, time and voltage values are only used as examples for description. However, the present invention is not limited thereto. In details of this embodiment, the reverse gate drive signal VXG are performed by a logical NOR operation on the gate drive signals VG1, VG2, VG3, VG4, and VG5. In another embodiment, the reverse gate drive signal is at a complementary level of a surrounding circuit signal. For example, the surrounding circuit signal is a single frequency signal or multiple frequency signals. Therefore, the reverse gate drive signal is at a complementary level of the single frequency signal or is also at a complementary level of a combination of the multiple frequency signals. As shown in FIG. 5B, FIG. 5B is a schematic waveform diagram illustrating a reverse gate drive signal according to another embodiment of the present invention, and only two groups of surrounding circuit signals are used for description. The surrounding circuit signals are a first multiplexer control signal MUX1 and a second multiplexer control signal MUX2, and the reverse gate drive signal VXG is at a complementary level of a combination of the first multiplexer control signal MUX1 and the second multiplexer control signal MUX2. As shown in FIG. 5B, when the first multiplexer control signal MUX1 is at a high voltage level H and the second multiplexer control signal MUX2 is at a low voltage level L, the combination of them is at a high voltage level. In this period, the reverse gate drive signal VXG is at the low voltage level L. Similarly, when the first multiplexer control signal MUX1 is at the low voltage level L and the second multiplexer control signal MUX2 is at the low voltage level L, the combination of them is at the low voltage level. In this period, the reverse gate drive signal VXG is at the high voltage level H. In another embodiment, the reverse gate drive signal is at a complementary level of a combination of the surrounding circuit signal and the gate drive signal. The reverse gate drive signal is at a complementary level of different signals or a combination of multiple signals for the different needs. In the manners described above, mutually offsetting parasitic capacitors can be formed, so as to reduce interference. The signal waveforms shown in FIG. 5A and FIG. 5B are for schematic description, but the present invention is not limited thereto. The signal waveforms are square waves, sine waves, chamfered square waves, or the like according to different actual conditions. In addition, in the embodiment of FIG. 4, the reverse gate electrode XGS is disposed within the active area AA, but the present invention is not limited thereto. The reverse gate electrode XGS is also disposed in the surrounding area SA due to some factors, such as convenience of a manufacture procedure and a wiring design.

Referring to FIG. 6, FIG. 6 is a schematic cross-section diagram illustrating a display device 600 according to another embodiment of the present invention. In FIG. 6, the display device 600 further includes an electrostatic shielding layer BS-ITO, a common electrode 610, a gate electrode GS, shielding electrodes 620-1 and 620-2, a multiplexer circuit MUX, and a shift register circuit SR. In this embodiment, the shielding metal layer of the display device 600 includes multiple shielding electrodes, such as a first shielding electrode 620-1 and a second shielding electrode 620-2. A location of the first shielding electrode 620-1 corresponds to the shift register circuit SR, and a location of the second shielding electrode 620-2 corresponds to the multiplexer circuit MUX.

In details, overlapping areas are where the first shielding electrode 620-1 and the shift register circuit SR are overlapped in a vertical direction, and overlapping areas are where the second shielding electrode 620-2 and the multiplexer circuit MUX are overlapped in a vertical direction. In addition, the first shielding electrode 620-1 and the second shielding electrode 620-2 are both electrically isolated from the common electrode 610, and the electrodes are separate in structure. In addition, the first shielding electrode 620-1, the second shielding electrode 620-2 and the common electrode 610 also receive different voltage sources so that the electrodes are power-isolated. Therefore, the first shielding electrode 620-1 shields and isolates noises generated from the shift register circuit SR, and the second shielding electrode 620-2 shields and isolates noises generated from the multiplexer circuit MUX. In this embodiment, the shift register circuit SR includes a frequency signal electrode CK and a reverse frequency signal electrode XCK, to respectively transmit a frequency signal and a reverse frequency signal. The multiplexer circuit MUX includes a first control signal metal wire SWR and a second control signal metal wire SWG, to separately transmit data-controlling signals of the display device. However, the present invention is not limited thereto. The shift register circuit SR further includes other electrode structures or components. Likewise, the multiplexer circuit MUX also includes other electrode structures or components. For example, multiple electrodes of the multiplexer circuit MUX separately receive multiple frequency signals of different time sequences.

Referring to FIG. 7 below, FIG. 7 is a schematic cross-section diagram illustrating of a display device according to an embodiment of the present invention. In this embodiment, the shielding metal layer of the display device 700 includes a first shielding electrode 720-1 and a second shielding electrode 720-2. A location of the first shielding electrode 720-1 corresponds to both the shift register circuit SR and the multiplexer circuit MUX, and a location of the second shielding electrode 720-2 also corresponds to the shift register circuit SR and the multiplexer circuit MUX. In the embodiment of FIG. 7, the first shielding electrode 720-1 and the second shielding electrode 720-2 are substantially configured in parallel and are overlapped in a vertical projection direction.

In details, please referring to FIG. 7, in this embodiment, the first shielding electrode 720-1 is configured above the second shielding electrode 720-2, and the parasitic capacitor Cp is formed between the first shielding electrode 720-1 and the second shielding electrode 720-2. In this embodiment, shielding voltages respectively received by the first shielding electrode 720-1 and the second shielding electrode 720-2 are power-isolated and are the same voltage levels, so that the parasitic capacitor Cp formed between the first shielding electrode 720-1 and the second shielding electrode 720-2 is existed with no voltage difference, to further improve a noise shielding effect and reduce interference with the common electrode. It results to improve the display quality and touch sensing sensitivity.

Referring to FIG. 8, FIG. 8 is a schematic top view illustrating a display device according to another embodiment of the present invention. In the embodiment of FIG. 8, the shielding metal layer of the display device 800 includes multiple shielding electrodes and those shielding electrodes are respectively disposed at different sides of the active area AA. In details, the shielding metal layer includes a first shielding electrode 820-1, a second shielding electrode 820-2, and a third shielding electrode 820-3, which are respectively disposed at the different sides of the active area AA. The surrounding circuit includes a first shift register circuit SR-1, a second shift register circuit SR-2, and the multiplexer circuit MUX. The first shift register circuit SR-1 and the second shift register circuit SR-2 are respectively located at two opposite sides of the active area AA, and the multiplexer circuit MUX is located at the other side of the active area AA, so that the multiplexer circuit MUX is located between the first shift register circuit SR-1 and the second shift register circuit SR-2. In this embodiment, a location of the first shielding electrode 820-1 corresponds to the first shift register circuit SR-1, a location of the third shielding electrode 820-3 corresponds to the second shift register circuit SR-2, and a location of the second shielding electrode 820-2 corresponds to the multiplexer circuit MUX. The location correspondences mentioned in the above indicate that projection areas of two components in a vertical direction are overlapped to be the overlapping areas. In the embodiment of FIG. 8, for clear showing and description, an area of the shielding electrode is greater than circuit zone areas, but the present invention is not limited thereto. An overlapping relationship between the projection areas of the shielding electrode and the circuit zone areas in a vertical direction is adjusted according to an actual noise situation. For example, areas of the shielding electrode and the circuit zones are substantially same and mutually completely overlap. In addition, locations of the shift register circuit and the multiplexer circuit also are adjusted according to different needs. For example, the shift register circuit and the multiplexer circuit are at a same side or different sides of the active area AA. The present invention is not limited to the configuration of the embodiment of FIG. 8.

In this embodiment, the display device 800 also includes the common signal pads AACOM1 and AACOM2 and the shielding signal pads S1_COM1, S1_COM2, S2_COM1, S2_COM2, S3_COM1, and S3_COM2. The common signal pads AACOM1 and AACOM2 are coupled to the common electrode in the active area AA by a wire 830. The shielding signal pads S1_COM1, S1_COM2, S2_COM1, S2_COM2, S3_COM1, and S3_COM2 are separately coupled to the shielding metal layers in surrounding areas SA1 to SA3 by wires 840. The common signal pads AACOM1 and AACOM2 receive a common voltage, and the shielding signal pads S1_COM1, S1_COM2, S2_COM1, S2_COM2, S3_COM1, and S3_COM2 are used to receive a shielding voltage. In this embodiment of the present invention, voltage levels of the common voltage and the shielding voltage are substantially the same or different.

In this embodiment, the shielding signal pads are configured at two adjacent sides or opposite sides of the common signal pads, and as shown in FIG. 8, the shielding signal pads S1_COM1, S1_COM2, S2_COM1, S2_COM2, S3_COM1, and S3_COM2 and the common signal pads AA_COM1 and AA_COM2 are disposed at a same side of the display device 800. However, the present invention is not limited thereto. Adjustment is performed according different needs of wires, signal pads, or chips. For example, the shielding signal pads are disposed at one side of the display device, and the common signal pads are disposed at another side.

In addition, in the display device 800 of this embodiment, the configuration and implementation methods of the first substrate, second substrate, display dielectric layer, shielding signal pad, electrostatic shielding layer, common electrode, and multiple shielding electrodes in the display device 800 are described in the embodiments of FIG. 2 to FIG. 7. Therefore, details are not mentioned here.

Figure 9:
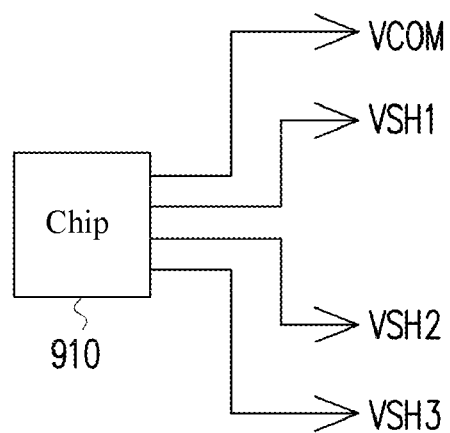
FIG. 9 is a schematic diagram illustrating a power generation method of a display device according to an embodiment of the present invention.

FIG. 9 is a schematic diagram illustrating a power generation method of a display device according to another embodiment of the present invention. The display device further includes a chip 910, and shielding voltages VSH1 to VSH3 and a common voltage VCOM generated by using the chip 910 are power-isolated from each others. The chip 910 includes multiple operational amplification units, and each operational amplification unit corresponds to a single pin of the chip 910. Therefore, the common voltage VCOM, a shielding voltage VSH1, a second shielding voltage VSH2, and a third shielding voltage VSH3 generated separately from the operational amplification units through the different pins of the chip 910 are provided to the common electrode and the shielding metal layer. In this way, power-isolated voltage sources are inputted to the common electrode and the shielding metal layers. When the power-isolated voltage sources are received to the display device, noises generated from a surrounding circuit are shielded by the shielding metal layer, thereby reducing interference with the common electrode. It results to optimize display quality or improve touch sensing sensitivity. In the embodiment of FIG. 9, the chip 910 with three pins provides three of power-isolated shielding voltages, but the present invention is not limited thereto. Other quantities of pins are set due to different demands to supply different quantities of shielding voltages. In addition, the chip 910 is disposed on a circuit board, and voltages are transmitted to the display device by the circuits or wires. In another embodiment, the chip 910 are directly disposed on the first substrate or second substrate of the display device.

In other embodiments, the display device includes multiple chips, one of the chips provides a shielding voltage (such as the shielding voltage VSH1) to the shielding metal layer, another one of the chips provides the common voltage VCOM to the common electrode. It also results the shielding voltage is made to be power-isolated from the common voltage VCOM.

In this embodiment of the present invention, the common electrode of the display device receives the common voltage through the common signal pads and the shielding metal layer receives the shielding voltage through the shielding signal pad, wherein the common signal pad and shielding signal pad are separately coupled to the corresponding operational amplification or chip. That is, the common electrode and the shielding metal layer individually receive the common voltage and the shielding voltage by common signal pads and the shielding signal pads. It makes the common electrode and the shielding metal layer be mutually electrically isolated in structure and power-isolated.

In conclusion, the embodiments of the present invention provide a display device, comprises the common electrode and the shielding metal layer which is electrically isolated in structure and power-isolated to the common electrode. It reduces noise interference between the active area and the surrounding area to improve the touch sensitivity and the display quality.

Although the present invention is disclosed as above by using the embodiments, the embodiments are not intended to limit the present invention. A person of ordinary skill in the art may further make variations and improvements without departing from the spirit and scope of the present invention. Therefore, the protection scope of the present invention should be subject to the appended claims.

What is claimed is:

1. A display device, comprising:
   an active area, comprising:
      a common electrode for receiving a common voltage; and
      a gate electrode, receiving a gate drive signal;
   a surrounding area, located at a side of the active area, comprising:
      a shielding metal layer comprising a first shielding electrode and a second shielding electrode, wherein said shielding metal layer is electrically isolated from the common electrode and receiving a shielding voltage; and
      a surrounding circuit comprising a shift register circuit and a multiplexer circuit, wherein the surrounding circuit receives a plurality of surrounding signals;
      wherein the first shielding electrode is located correspondingly to the shift register circuit, and the second shielding electrode is located correspondingly to the multiplexer circuit;
   a plurality of operational amplification units, located at the surrounding area, wherein the operational amplification units separately provide the common voltage and the shielding voltage;
   a first parasitic capacitor connecting said shielding metal layer to said shift register circuit; and
   a second parasitic capacitor connecting said shielding metal layer to said multiplexer circuit.

2. The display device according to claim 1, wherein the first shielding electrode and the second shielding electrode are overlapped in a vertical projection direction.

3. The display device according to claim 1, wherein the first shielding electrode is power-isolated from the second shielding electrode.

4. The display device according to claim 1, wherein said shift register comprises a frequency signal electrode and a reverse frequency signal electrode to respectively transmit a frequency signal and a reverse frequency signal.

5. The display device according to claim 1, wherein said multiplexer circuit transmits data-controlling signals of the display device.

6. The display device according to claim 1, further comprising:
   a parasitic capacitor connecting said shielding metal layer to said surrounding circuit.

7. The display device according to claim 1, further comprising:
   a parasitic capacitor connecting said gate electrode and said gate electrode.

8. The display device according to claim 1, said surrounding area further comprises a first shielding metal layer and a second shielding metal layer, wherein said first shielding metal layer and said second shielding metal layer are connected via a parasitic capacitor.

9. The display device according to claim 1, wherein the common voltage is different from the shielding voltage.

10. The display device according to claim 9, wherein the shielding voltage is ground.

11. A display device, comprising:
    an active area, comprising:
       a common electrode for receiving a common voltage; and
       a gate electrode, receiving a gate drive signal;
    a surrounding area, located at a side of the active area, comprising:
       a shielding metal layer comprising a first shielding electrode and a second shielding electrode, wherein said shielding metal layer is electrically isolated from the common electrode and receiving a shielding voltage; and
       a surrounding circuit comprising a shift register circuit and a multiplexer circuit, wherein the surrounding circuit receives a plurality of surrounding signals;
       wherein the first shielding electrode is located correspondingly to the shift register circuit, and the second shielding electrode is located correspondingly to the multiplexer circuit;
    a first operational amplification unit, electrically connected to the shielding metal layer;
    a second operational amplification unit, electrically connected to the common electrode;
    a chip, individually electrically connected to the first operational amplification unit and a second operational amplification via a voltage input pad;
    a first parasitic capacitor connecting said shielding metal layer to said shift register circuit; and
    a second parasitic capacitor connecting said shielding metal layer to said multiplexer circuit.

12. A display device, comprising:
    an active area, comprising:
       a common electrode for receiving a common voltage; and
       a gate electrode, receiving a gate drive signal;
    a surrounding area, located at a side of the active area, comprising:
       a shielding metal layer comprising a first shielding electrode and a second shielding electrode, wherein said shielding metal layer is electrically isolated from the common electrode and receiving a shielding voltage; and
       a surrounding circuit comprising a shift register circuit and a multiplexer circuit, wherein the surrounding circuit receives a plurality of surrounding signals;
       wherein the first shielding electrode is located correspondingly to the shift register circuit, and the second shielding electrode is located correspondingly to the multiplexer circuit;
    a first common signal pad and a second common signal pad, located at the surrounding area, wherein the common electrode is individually connected to the first common signal pad and the second common signal pad via a first wire;
    a first shielding signal pad and a second shielding signal pad, located at the surrounding area, wherein the shielding metal layer is individually connected to the first shielding signal pad and the second shielding signal pad via a second wire;
    a chip, located on the surrounding area, wherein the chip provides the common voltage to the first common signal pad and the second common signal pad, and provides the shielding voltage to first shielding signal pad and the second shielding signal pad;

a plurality of operational amplification units, located at the surrounding area, wherein the operational amplification units separately amplifies the common voltage and the shielding voltage;

a first parasitic capacitor connecting said shielding metal layer to said shift register circuit; and a second parasitic capacitor connecting said shielding metal layer to said multiplexer circuit.

13. The display device according to claim 12, said plurality of operational amplification units comprises a first operational amplification unit and a second operational amplification unit, wherein the chip is electrically connected to the first shielding signal pad the second shielding signal pad via the first operational amplification unit, and the chip is electrically connected to the first common signal pad and second common signal pad via the second operational amplification unit.

14. The display device according to claim 12, wherein the chip comprises said plurality of operational amplification units, said plurality of amplification units has a first operational amplification unit and a second operational amplification unit, the first operational amplification unit is electrically connected to the first shielding signal pad and the second shielding signal pad, and the second operational amplification unit is electrically connected to the first common signal pad and second common signal pad via the second operational amplification unit.

15. The display device according to claim 12, wherein the common voltage is different from the shielding voltage.

16. The display device according to claim 15, wherein the shielding voltage is ground.

17. The display device according to claim 1, wherein said active area further comprises a reverse gate electrode electrically isolated from the gate electrode and receiving a reverse gate drive signal.

* * * * *